(12) United States Patent
Sharma et al.

(10) Patent No.: US 11,245,887 B2
(45) Date of Patent: Feb. 8, 2022

(54) ELECTRONIC DEVICE AND OPERATION METHOD THEREFOR

(71) Applicant: Samsung Electronics Co., Ltd., Suwon-si (KR)

(72) Inventors: Prashant Sharma, Middlesex (GB); Albert Saa-Garriga, Middlesex (GB); Alessandro Vandini, Middlesex (GB); Tommaso Maestri, Middlesex (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/637,539

(22) PCT Filed: Jul. 6, 2018

(86) PCT No.: PCT/KR2018/007679
§ 371 (c)(1),
(2) Date: Feb. 7, 2020

(87) PCT Pub. No.: WO2019/054611
PCT Pub. Date: Mar. 21, 2019

(65) Prior Publication Data
US 2020/0260062 A1 Aug. 13, 2020

(30) Foreign Application Priority Data

Sep. 14, 2017 (GB) ..................... 1714804
May 10, 2018 (KR) .............. 10-2018-0053924

(51) Int. Cl.
*H04N 13/122* (2018.01)
*G06N 99/00* (2019.01)
(Continued)

(52) U.S. Cl.
CPC ... *H04N 13/122* (2018.05); *H04N 2013/0085* (2013.01)

(58) Field of Classification Search
None
See application file for complete search history.

(56) References Cited

U.S. PATENT DOCUMENTS 9,710,973 B2    7/2017  Bar-Zeev et al.
2012/0121138 A1  5/2012  Fedorovskaya et al.
(Continued)

FOREIGN PATENT DOCUMENTS

CN    102591449 A    7/2012
CN    104735464 A    6/2015
(Continued)

OTHER PUBLICATIONS

Judd et al., "Learning to predict where humans look", IEEE International Conference on Computer Vision (ICCV), p. 2106-2113, 2009.*
(Continued)

*Primary Examiner* — Hung Q Dang
(74) *Attorney, Agent, or Firm* — Jefferson IP Law, LLP

(57) ABSTRACT

Provided is an electronic device for stabilizing a 360-degree video, the electronic device including a memory storing one or more instructions, and a processor for executing the one or more instructions stored in the memory, wherein the processor is configured to execute the one or more instructions to: when a 360-degree video is reproduced, allocate probability values to a plurality of pixels included in a frame of the 360-degree video, based on a possibility that each of the plurality of pixels is included in a user's field of view (FOV), determine a three-dimensional (3D) rotation for the 360-degree video, based on the allocated probability values, and generate a stabilized 360-degree video by applying the 3D rotation to the 360-degree video.

16 Claims, 17 Drawing Sheets

(51) Int. Cl.
*G06T 15/10* (2011.01)
*H04N 13/117* (2018.01)
*H04N 13/383* (2018.01)
*H04N 21/81* (2011.01)
*G06T 3/00* (2006.01)
*G06T 19/20* (2011.01)
*G06T 15/20* (2011.01)
*H04N 13/00* (2018.01)

(56) References Cited

U.S. PATENT DOCUMENTS

| | | | |
|---|---|---|---|
| 2012/0307079 A1 | 12/2012 | Yumiki et al. | |
| 2014/0176296 A1 | 6/2014 | Morgan | |
| 2014/0354515 A1 | 12/2014 | Lavalle et al. | |
| 2016/0012855 A1* | 1/2016 | Krishnan | G11B 27/105 386/241 |
| 2016/0042566 A1* | 2/2016 | Mao | A63F 13/825 463/32 |
| 2016/0228771 A1 | 8/2016 | Watson | |
| 2016/0344934 A1* | 11/2016 | Kato | H04N 5/23293 |
| 2017/0018121 A1 | 1/2017 | Lawson et al. | |
| 2017/0126977 A1 | 5/2017 | Klivington et al. | |
| 2017/0132845 A1 | 5/2017 | Everman, II | |
| 2017/0155887 A1 | 6/2017 | Zhou | |
| 2017/0160795 A1 | 6/2017 | Hu | |
| 2017/0180647 A1 | 6/2017 | Karpenko | |
| 2017/0249010 A1 | 8/2017 | Jung et al. | |
| 2017/0285732 A1* | 10/2017 | Daly | G06F 3/013 |
| 2018/0007381 A1* | 1/2018 | Sclar | H04N 19/102 |
| 2018/0063440 A1 | 3/2018 | Kopf | G06T 5/002 |
| 2019/0035125 A1* | 1/2019 | Bellows | G06T 11/60 |
| 2019/0108859 A1 | 4/2019 | Krishnan | |
| 2019/0356894 A1* | 11/2019 | Oh | H04N 21/234345 |
| 2020/0098193 A1 | 3/2020 | Mao | |
| 2021/0142452 A1* | 5/2021 | Saa-Garriga | G06T 5/006 |

FOREIGN PATENT DOCUMENTS

| | | |
|---|---|---|
| CN | 204465755 U | 7/2015 |
| CN | 105976424 A | 9/2016 |
| CN | 106534616 A | 3/2017 |
| CN | 106537894 A | 3/2017 |
| CN | 106659932 A | 5/2017 |
| KR | 10-1538923 B1 | 7/2015 |
| WO | 2015/170142 A1 | 11/2015 |
| WO | 2017/003769 A1 | 1/2017 |

OTHER PUBLICATIONS

International Search Report with English translation dated Oct. 14, 2018; International Appln. No. PCT/KR2018/007679.

GB Search Report dated Feb. 20, 2018; GB Appln. No. GB1714804.0.

European Search Report dated Jul. 23, 2020; European Appln. No. 18855989.2-1209 / 3654644 PCT/KR2018007679.

Yanan et al.; Shooting a moving target: Motion-prediction-based transmission for 360-degree videos; 2016 IEEE International Conference on Big Data (Big Data); IEEE; Dec. 5, 2016; pp. 1161-1170; XP033056498.

El-Ganainy; Spatiotemporal Rate Adaptive Tiled Scheme for 360 Sports Events; Arxiv.org, Cornell University Library; 201 Olin Library Cornell University Ithaca, NY 14853; May 14, 2017; XP080947787.

European Search Report dated Apr. 3, 2020; European Appln. No. 18855989.2-1209 PCT/KR2018007679.

Chinese Office Action with English translation dated Mar. 18, 2021; Chinese Appln. No. 201880059836.5.

Peng et al.; A Natural 3D Viewpoint Control System; Journal of Computer-Aided Design & Computer Graphics; vol. 22, No. 11; Nov. 2010; Beijing, CN.

Chinese Office Action with English translation dated Aug. 5, 2021; Chinese Appln. No. 201880059836.5.

* cited by examiner

FIG. 1
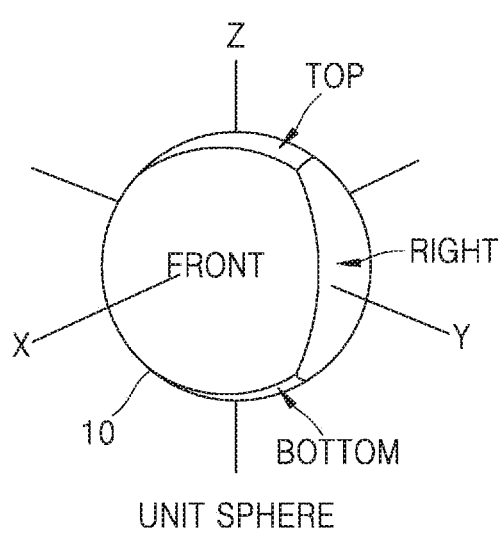
UNIT SPHERE
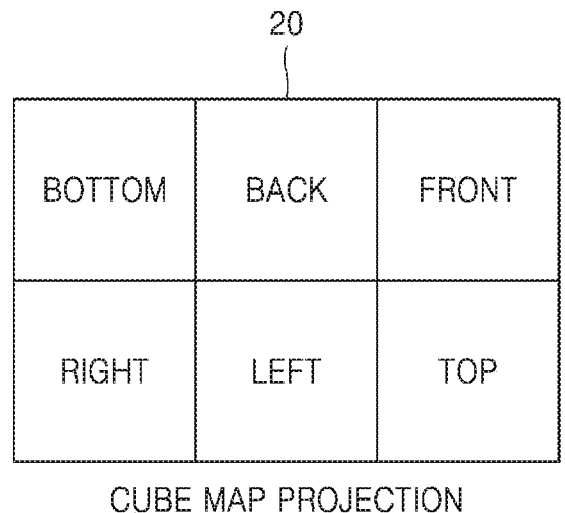
CUBE MAP PROJECTION
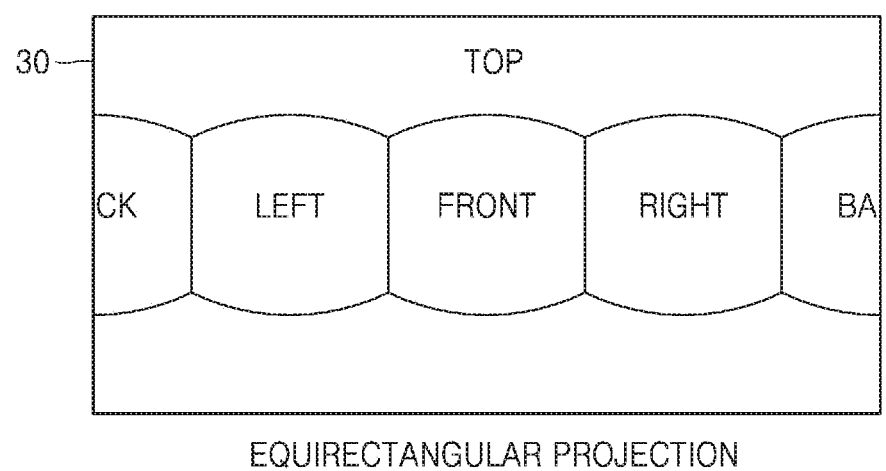
EQUIRECTANGULAR PROJECTION

700

1000

ELECTRONIC DEVICE AND OPERATION METHOD THEREFOR

TECHNICAL FIELD

Various embodiments relate to an electronic device and an operation method thereof, and more particularly, to an electronic device capable of stabilizing a 360-degree video and an operation method thereof.

BACKGROUND ART

When a 360-degree video is reproduced, users may suffer from so-called virtual reality (VR) sickness. The VR sickness shows some similarities to motion sickness in terms of symptoms. The VR sickness may be regarded as being due to a result of users receiving a contradictory sensory input while experiencing VR. The VR sickness may be relieved by video stabilization to correct undesired camera movements (e.g., shaking or a tremor of the hand). Camera shaking in particular may be an important issue in the case of a video captured by a portable camera system.

Video stabilization is a post-processing stage, and most video stabilization techniques require two separate tasks. First, an undesired motion is detected and suppressed according to an estimated camera trajectory. Second, a new image sequence is created using a stable camera trajectory and an original image sequence. However, when different parts of a scene are moving at different speeds or in different directions, a video cannot be stabilized with respect to all parts of the scene. Thus, even after video stabilization has been applied, a user may still experience discomfort. Therefore, there is a need for an improved method of stabilizing a 360-degree video.

DESCRIPTION OF EMBODIMENTS

Technical Problem

Various embodiments provide an electronic device capable of stabilizing a 360-degree video, based on a probability value allocated to each pixel included in one or more frames of the 360-degree video, and an operation method thereof.

Solution to Problem

According to one aspect, an electronic device for stabilizing a 360-degree video includes a memory storing one or more instructions, and a processor configured to execute the one or more instructions stored in the memory to: when the 360-degree video is reproduced, allocate probability values to a plurality of pixels included in a frame of the 360-degree video, based on a possibility that each of the plurality of pixels is included in a user's field of view (FoV), determine a three-dimensional (3) rotation for the 360-degree video, based on the allocated probability values, and generate a stabilized 360-degree video by applying the 3D rotation to the 360-degree video.

Advantageous Effects of Disclosure

An electronic device according to an embodiment is capable of stabilizing a 360 degree video to reduce motion sickness or dizziness of a user who is viewing the 360-degree video.

BRIEF DESCRIPTION OF DRAWINGS

FIG. 1 is a diagram illustrating formats of video data for a 360-degree video.

BEST MODE

Figure 2:
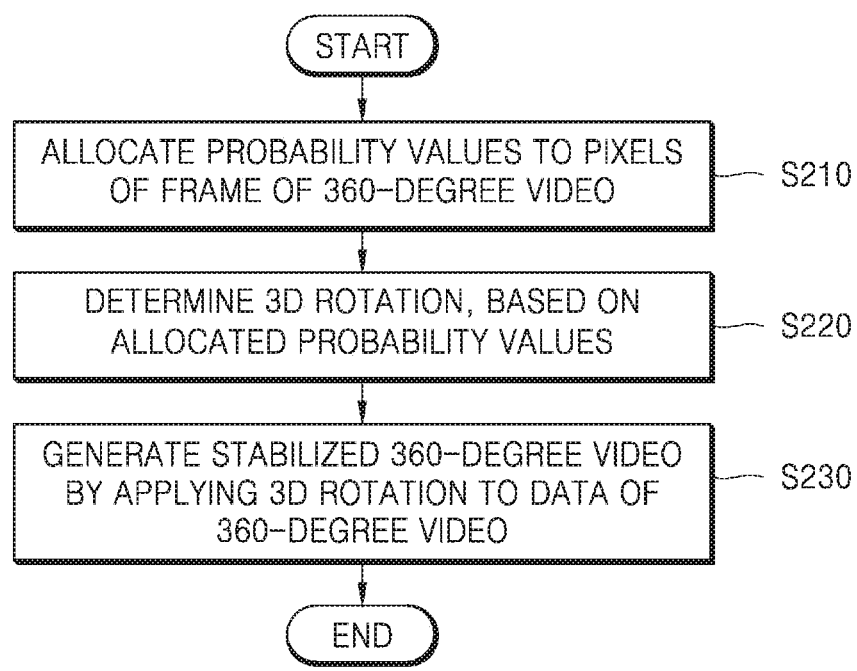
FIG. 2 is a flowchart of an operation method of an electronic device according to an embodiment.

According to one aspect, an electronic device for stabilizing a 360-degree video includes a memory storing one or more instructions, and a processor configured to execute the one or more instructions stored in the memory to: when the 360-degree video is reproduced, allocate probability values to a plurality of pixels included in a frame of the 360-degree video, based on a possibility that each of the plurality of pixels is included in a user's field of view (FoV), determine a three-dimensional (3) rotation for the 360-degree video, based on the allocated probability values, and generate a stabilized 360-degree video by applying the 3D rotation to the 360-degree video.

In one embodiment, the processor may be further configured to execute the one or more instructions to allocate the probability values to the plurality of pixels when the 360-degree video is viewed, based on first viewing history data including information about FoVs of previous users.

In one embodiment, the processor may be further configured to execute the one or more instructions to determine a probability value to be allocated to one of the plurality of pixels, based on one or more features of the pixel, wherein the one or more features may include at least one of: a type of an object that includes the pixel; a depth property related to a distance between a camera and a region of the frame of the 360-degree video in which the pixel is included; a visual importance of the region in which the pixel is included, relative to one or more other regions of the frame of the 360-degree video; a motion vector associated with the pixel; a boundary in a saliency map of the 360-degree video which includes the pixel; or a position of a pixel corresponding to one or more sound sources within the frame of the 360-degree video.

In one embodiment, the processor may be further configured to execute the one or more instructions to determine a probability value to be allocated to the pixel by using a machine learning algorithm to which the one or more features of the pixel are input as an input.

In one embodiment, the processor may be further configured to execute the one or more instructions to, when one or more other 360-degree videos are viewed, train the machine learning algorithm by using second viewing history data including information about FoVs of previous users and well-known features of pixels included in the one or more other 360-degree videos.

In one embodiment, the processor is further configured to execute the one or more instructions to generate the stabilized 360-degree video by applying the determined rotation to data of the 360-degree video and rendering the data to which the determined rotation is applied.

In one embodiment, the processor may be further configured to execute the one or more instructions to set a 3D rotation parameter for the 360-degree video according to the determined rotation.

In one embodiment, the processor may be further configured to execute the one or more instructions to allocate one or more pixels included in the 360-degree video to at least one cluster, and determine a 3D rotation for the at least one cluster, based on probability values allocated to the pixels included in the at least one cluster.

In one embodiment, the processor may generate the stabilized 360-degree video by selecting a cluster corresponding to a current viewpoint of the user and applying a 3D rotation for the selected cluster to the 360-degree video.

In one embodiment, the processor may determine a center of a current field of view of the user as the current viewpoint of the user.

In one embodiment, the processor may determine the current viewpoint of the user by eye tracking.

In one embodiment, the electronic device for stabilizing a 360-degree video may further include a display displaying the stabilized 360-degree video.

According to another aspect, an operation method of an electronic device for stabilizing a 360-degree video includes allocating probability values to a plurality of pixels included in a frame of the 360-degree video when the 360-degree video is reproduced, based on a possibility that each of the plurality of pixels is included in a user's field of view, determining a three-dimensional (3) rotation for the 360-degree video, based on the allocated probability values, and generating a stabilized 360-degree video by applying the 3D rotation to the 360-degree video.

MODE OF DISCLOSURE

The terms used in the present specification will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the present disclosure.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Hereinafter, embodiments of the disclosure will be described in detail with reference to the accompanying drawings, so that the embodiments of the disclosure may be easily implemented by those of ordinary skill in the art. However, the present disclosure may be embodied in many different forms and is not limited to the embodiments set forth herein. For clarity, parts not related to explaining the disclosure are omitted in the drawings, and like components are denoted by like reference numerals throughout the specification.

The term "user" used in embodiments of the present disclosure refers to a person who controls a function or operation of an electronic device and may include an administrator or an installer.

FIG. 1 is a diagram illustrating formats of video data for a 360-degree video.

In one embodiment, video data for the 360-degree video may be expressed in various formats. Referring to FIG. 1, video data for a frame of a 360-degree video may be expressed in a unit sphere format, a cube map projection format, or an equirectangular projection format. In the unit sphere format, a position of each pixel on a surface of a virtual sphere 10 may be defined with coordinate values in a three-dimensional (3D) coordinate system. In cube map projection 20 or equirectangular projection 30, an equivalent two-dimensional (2D) representation may be used. In the cube map projection 20, image data of each side of a virtual cube may be stored in the form of a 2D image with a 90□□90□ field of view (FoV). In the equirectangular projection 30, video data may be stored in the form of one 2D image with a 360□□180□ FoV. In FIG. 1, labels 'top', 'bottom', 'front', 'back', 'left' and 'right' represent regions corresponding to video data of equivalent projections (e.g., the unit sphere format, the cube map projection format, and the equirectangular projection format). The formats illustrated in FIG. 1 are only examples, and in other embodiments, video data of a 360-degree video may be stored in a format different from those illustrated in FIG. 1.

FIG. 2 is a flowchart of an operation method of an electronic device according to an embodiment.

Referring to FIG. 2, the electronic device according to an embodiment may allocate probability values to pixels of a frame of a 360-degree video (S210).

For example, when the 360-degree video is reproduced, the electronic device 100 may allocate probability values to the pixels of the frame of the 360-degree video, based on a probability that each of the pixels is included in a FoV of a user. When a 360-degree video is viewed, the electronic device 100 may allocate probability values to the pixels, based on viewing history data including information about FoVs of previous users. This will be described in detail with reference to FIG. 3 below. Alternatively, the electronic device 100 may allocate probability values to the pixels, based on one or more characteristics of each of the pixels. The electronic device 100 may determine probability values to be allocated to the pixels by using a machine learning algorithm to which the one or more characteristics of each of the pixels is input as an input. This will be described in detail with reference to FIGS. 5 to 8 below.

The electronic device 100 may determine a three-dimensional (3D) rotation, based on the allocated probability values (S220). For example, the electronic device 100 may determine a rotation for stabilizing the 360-degree video for a pixel with a high probability of being included in a FoV. For example, the electronic device 100 may determine a rotation to reduce a motion vector for a current frame. The electronic device 100 may weight motion vectors for the current frame of the 360-degree video by using the probability values of the pixels, and convert a weighted average motion vector into a 3D rotation. The electronic device 100 may determine, as a stabilizing rotation, a rotation having the same magnitude as and an opposite direction to the 3D rotation. However, embodiments are not limited thereto.

In addition, the electronic device 100 may set a 3D rotation parameter in metadata associated with the 360-degree video according to the determined 3D rotation.

The electronic device 100 may generate a stabilized 360-degree video by applying the 3D rotation to data of the 360-degree video (S230).

For example, when a user wants to watch a 360-degree video, the electronic device 100 may read a 3D rotation parameter from the metadata associated with the 360-degree video. In addition, the electronic device 100 may determine a 3D rotation to be applied to a current video frame, based on the 3D rotation parameter. The electronic device 100 may generate a stabilized 360-degree video by applying the determined 3D rotation to the video data of the current frame of the 360-degree video and rendering the video data to which the 3D rotation is applied. However, embodiments are not limited thereto.

Figure 3:
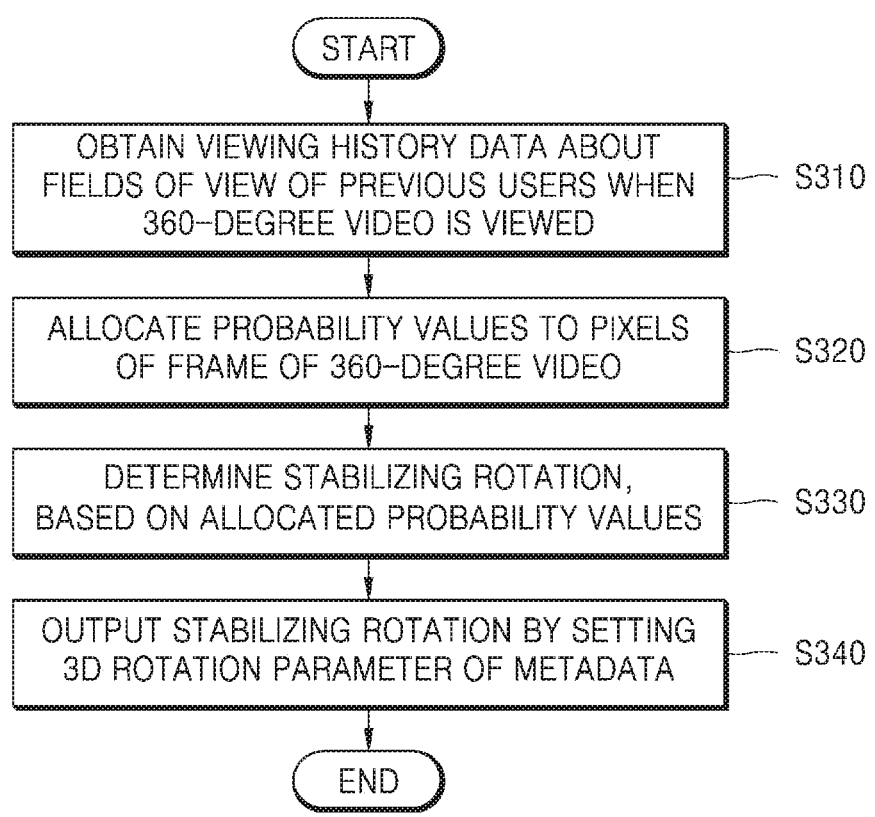
FIG. 3 is a flowchart of a method of stabilizing a 360-degree video by an electronic device according to an embodiment.

FIG. 3 is a flowchart of a method of stabilizing a 360-degree video by an electronic device according to an embodiment. In one embodiment, all operations included in the method of FIG. 3 may be performed by the same device or some operations may be performed by different devices. Any operations shown in FIG. 3 may be performed by software or hardware according to a certain embodiment. When one or more operations are performed by software, a device for performing the method may include a processing unit including one or more processors and a computer-readable memory storing computer program instructions for performing the operations of the method when executed by the processing unit.

Referring to FIG. 3, the electronic device 100 may obtain viewing history data for a 360-degree video (S310). The viewing history data includes information about a FoV of a previous user when the 360-degree video is viewed. For example, in operation 310, the electronic device 100 may transmit an identifier of a current 360-degree video file to an external server.) The external server may retrieve viewing history data corresponding to the identified 360-degree video file from viewing history data stored therein. The external server may transmit the retrieved viewing history data to the electronic device 100, and the electronic device 100 may receive the viewing history data corresponding to the 360-degree video file from the external server.

Alternatively, the viewing history data may be stored in a local memory. For example, in some embodiments, the viewing history data may be included in the 360 degree video file as metadata of the 360-degree video file. However, embodiments are not limited thereto.

Various methods may be used to determine the FoV of the previous user at any given point in time while the 360-degree video is reproduced. For example, a user may watch the 360-degree video by tracking a movement of a user's head by a sensor such as a gyroscope or an accelerometer and using a device which rotates a FoV of the video according to the movement of the user's head. In this case, a FoV displayed at any point in time during the reproduction of the 360-degree video may correspond to a direction the user is currently facing at the point in time. In this case, it may be assumed that a center of the FoV is a point at which the user is currently focusing, and the point may be considered as representing the user's FoV while the 360-degree video is reproduced. Alternatively, when the user is watching the 360-degree video through an eye tracking device having a function of tracking a user's eye movement, namely, a gaze tracking function, the eye tracking device may identify a portion, e.g., pixel coordinates, of the 360-degree video that the user is watching by using the gaze tracking function. As another alternative, in some embodiments, when the 360-degree video is displayed on a general display such as a computer monitor, an appropriate input device such as a mouse or a touch screen may be used to change an orientation of a camera while the 360-degree video is reproduced.

In one embodiment, the electronic device 100 may obtain viewing history data of the same user who is currently watching the 360-degree video. When viewing history data of a current user is available, a higher weight may be given to statistics of a FoV of the current user than statistics of FoVs of other users, when a probability value of each pixel is calculated. When viewing history data of a current user for other 360-degree videos other than a current 360-degree video is available, probability values of pixels of the current 360-degree video may be predicted, based on the viewing history data of the other 360-degree videos. The viewing history data of the other 360-degree videos may include information about previous behaviors of the current user when the current user was viewing the other 360-degree videos.

The electronic device 100 may allocate probability values to a plurality of pixels of frames of the 360-degree video (S320). The probability value allocated to each of the pixels is related to a likelihood that the pixel will be included in a FoV when the 360-degree video is reproduced. The probability values may be collectively represented in the form of a pixel probability map. In one embodiment, the viewing history data obtained in operation 310 may be used to determine which region of a frame of the 360-degree video is of most interest to a user. The electronic device 100 may allocate a large probability value to pixels that are more frequently included in FoVs of previous users, based on the obtained viewing history data. For example, a probability value of a pixel may be determined by counting the number of times the pixel has been at or near the center of the FoVs of the previous users.

In one embodiment, when viewing history data is not available for the current 360-degree video, another method of determining probability values may be used. In such an embodiment, operation 310 may be omitted. Examples of the other method of determining probability values will be described with reference to FIGS. 4 to 7 below.

Referring back to FIG. 3, the electronic device 100 may determine a 3D rotation for stabilizing the 360-degree video, based on the allocated probability values (S330).

Thus, the determined rotation may be referred to as a stabilizing rotation. The stabilizing rotation may be a rotation selected to stabilize the 360-degree video with respect to pixels that are likely to be included in a FoV. In this way, the stabilizing rotation is applicable to video data of each frame of the 360-degree video. As a result, an image seen by a user when the video is displayed may be stabilized with respect to a pixel on which the user is more likely to focus. In this way, part of the image that the user is likely to view may be stably maintained, thereby assisting alleviation of motion sickness generally associated with the 360-degree video.

The electronic device 100 may determine the stabilizing rotation by any appropriate method. For example, the electronic device 100 may determine the stabilizing rotation, taking into consideration a motion vector for a previous frame of the 360-degree video. The stabilizing rotation may be determined to reduce a motion vector for a current frame. For example, the electronic device 100 may weight motion vectors for the current frame and use pixel probability values to calculate a weighted average motion vector for all frames. In addition, the electronic device 100 may convert the weighted average motion vector into a 3D rotation and set as a stabilizing rotation a rotation having the same magnitude as and an opposite direction to the 3D rotation. When the stabilizing rotation is determined in this way, higher weights are allocated to motion vectors associated with pixels on which a user is more likely to focus during the reproduction of the 360-degree video and thus the video may appear to be more stabilized with respect to pixels on which the user is more probably focus.

In another embodiment, the electronic device 100 may determine the stabilizing rotation by using a vision-based processing method applied to a current frame i so as to extract features. In vision-based processing, features may be referred to as 'key points' or 'points of interest' and are elements easily trackable from one frame to a subsequent frame. The electronic device 100 may easily track these features in a next frame (i+1). The electronic device 100 may calculate a stabilizing rotation for the next frame (i+1) by using pixel probability values determined by weighting a level of contribution of each feature with respect to an estimated rotation value, based on motions of features between the current frame i and the next frame (i+1).

The electronic device 100 may output the determined stabilizing rotation (S340). For example, the electronic device 100 may output the stabilizing rotation by setting a 3D rotation parameter in metadata associated with the 360-degree video according to the determined 3D rotation. Metadata and video data of the 360-degree video may be output together, for example, by transmitting the metadata and the video data in a broadcast stream or by storing the metadata and the video data in computer-readable memory for later distribution.

In another embodiment, the electronic device 100 may directly provide the stabilizing rotation to a video processor which processes frames of a 360-degree video rather than proving the stabilizing rotation in the form of metadata of the 360-degree video. For example, the video processor may apply the stabilization rotation to video data of a current frame and render a rotated video to apply the stabilizing rotation to the 360-degree video. This method is available when the electronic device 100 calculates a stabilizing rotation in real time while a user watches the 36-degree video. However, embodiments are not limited thereto.

Figure 4:
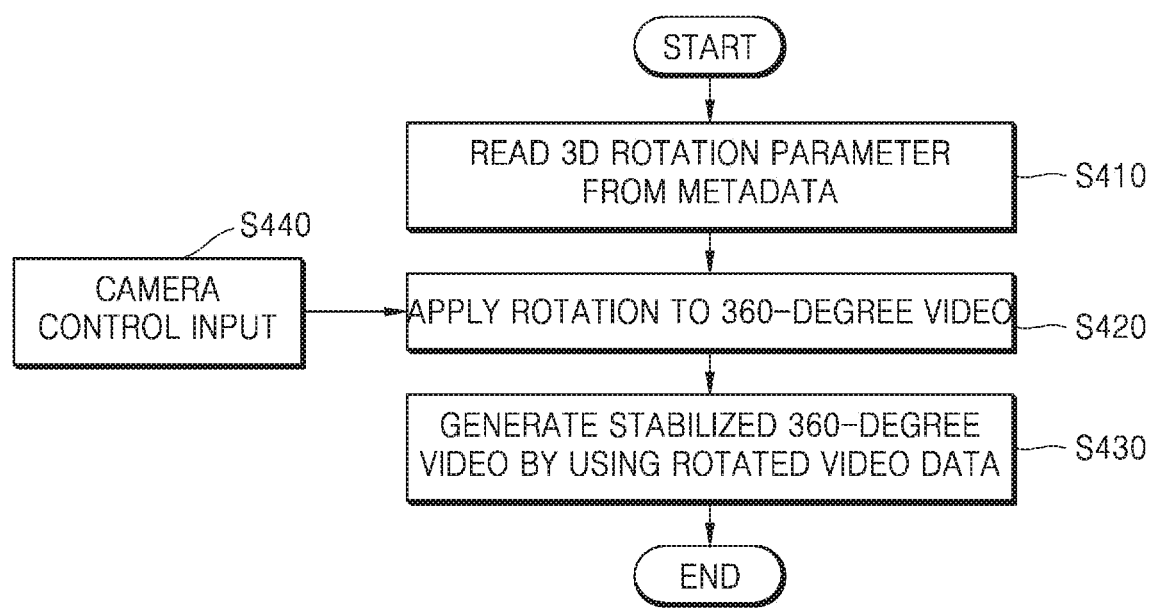
FIG. 4 is a flowchart of a method of generating a stabilized 360-degree video by an electronic device according to an embodiment.

FIG. 4 is a flowchart of a method of generating a stabilized 360-degree video by an electronic device according to an embodiment.

Referring to FIG. 4, when a user wants to watch a 360-degree video, the electronic device 100 may read a 3D rotation parameter from metadata associated with the 360-degree video (S410). The electronic device 100 may determine a stabilizing rotation to be applied to a current video frame, based on the 3D rotation parameter. In some embodiments, a separate stabilizing rotation may be defined for each individual frame of 360-degree video. In another embodiment, a single stabilizing rotation may be defined for a plurality of frames (e.g., ten frames) of the 360-degree video.

The electronic device 100 may rotate video data of the current frame of the 360-degree video according to the stabilizing rotation (S420), and generate a stabilized 360-degree video by rendering the rotated video data (S430). In one embodiment, the electronic device 100 may display the rendered video data. Alternatively, the electronic device 100 may output the rendered video data to an external display device that is physically separated from the electronic device 100.

In some embodiments, a user may change a FoV during the reproduction of the 360-degree video by providing a camera control input to the electronic device 100. The camera control input may be an input that defines at least one of camera rotation or camera translation. For example, the camera control input may be obtained automatically by tracking a motion of a user's head by using an appropriate sensor when the user views the 360-degree video through a virtual reality headset. When receiving the camera control input (S440), the electronic device 100 may apply at least one of camera rotation or camera translation to the 360-degree video, in addition to the stabilizing rotation. Accordingly, the operations of FIG. 4 are applicable to 360-degree videos for which a user's FoV is freely changeable during reproduction thereof.

In one embodiment, the stabilized 360-degree video may be displayed on either a device different from or the same as a device used to calculate a pixel probability map and the stabilizing rotation. Therefore, operations S410 to S440 of FIG. 4 may be performed by a device physically the same as or different from the device that performs operations S310 to S340 of FIG. 3. However, embodiments are not limited thereto.

Figure 5:
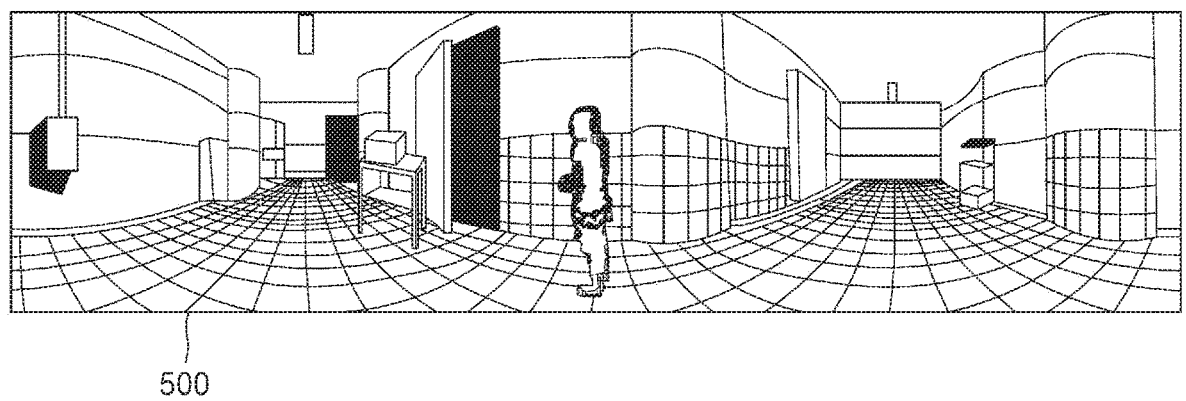
FIGS. 5 and 6 are diagrams for explaining a method of determining, by an electronic device, probability values for a 360-degree video according to an embodiment.
Figure 6:
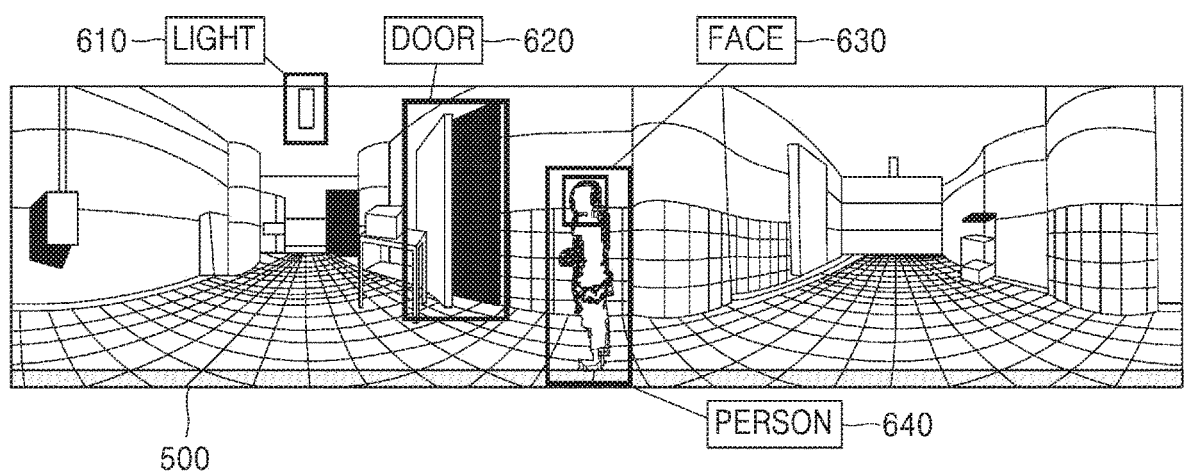

FIGS. 5 and 6 are diagrams for explaining a method of determining, by an electronic device, probability values for a 360-degree video according to an embodiment.

In one embodiment, when previous viewing history data is not available, the electronic device 100 may determine a probability value of each pixel, based on one or more characteristics of each pixel.

For example, FIG. 5 illustrates a 360-degree video frame 500 in an equirectangular projection format. In one embodiment, the electronic device 100 may detect one or more objects included in the 360-degree video frame 500 by analyzing the 360 degree video frame 500 using an object detection algorithm. The object detection algorithm may automatically allocate each object included in a 360-degree video frame to a certain kind or type of object. In addition, the electronic device 100 may store the kind or type of a determined object in the form of a metadata tag associated with the 360-degree video frame 500. Alternatively, in another embodiment, at least one of object detection or object type determination may be performed manually.

FIG. 6 illustrates examples of four different metadata tags associated with different types of objects within a 360-degree video frame 500. For example, metadata tags may include a 'light' object 610, a 'door' object 620, a 'face' object 630, and a 'person' object 640. A probability value allocated to a pixel may be determined according to the type of an object associated with the pixel. For example, it may be statistically determined that a user generally becomes more interested in a particular type of object and is more likely to view this type of object when watching a 360-degree video. Therefore, the electronic device 100 may set larger probability values for pixels included in objects in which the user is more interested. In contrast, the electronic device 100 may set smaller probability values for pixels included in objects in which the user is less interested.

Figure 7:
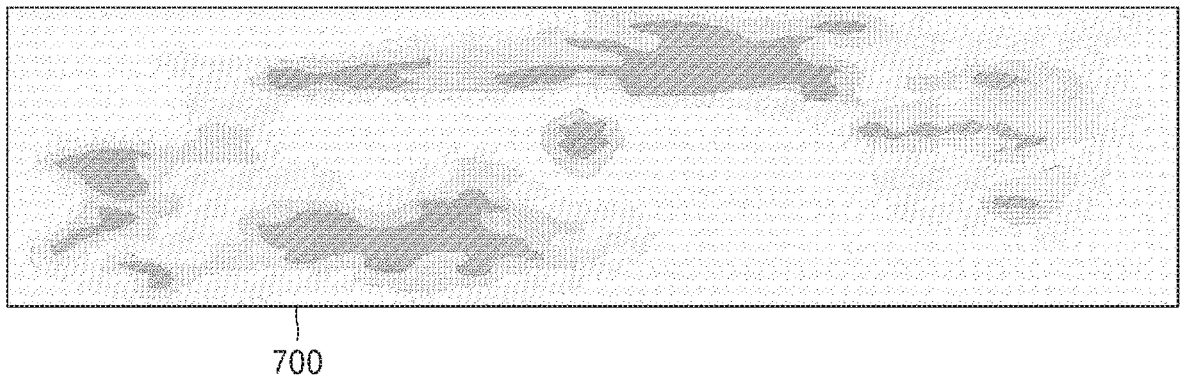
FIG. 7 is a diagram illustrating an example of a pixel probability map for a frame of the 360-degree video of FIG. 5.

FIG. 7 is a diagram illustrating an example of a pixel probability map for a frame of the 360-degree video of FIG. 5.

In a pixel probability map 700 according to one embodiment, each pixel represents whether it is included in an object, and may be associated with an object type property for identification of the type of the object when the pixel is included in the object. In addition, the electronic device 100 may determine pixel probability values in consideration of other pixel features, as well as the object type property illustrated in FIG. 6. For example, features of the pixel may include the following, but embodiments are not limited thereto:

the type of an object in which the pixel is included.
a depth property related to the distance between a camera of a scene including a pixel and a corresponding part,
a visual importance of a region of the frame of the 360-degree video in which the pixel is located, relative to one or more other regions of the frame of the 360-degree video,
a motion vector associated with the pixel,
a boundary in a saliency map of the frame of the 360-degree video which includes the pixel, and
the position of a pixel relative to the position of at least one sound source within the 360-degree video In some embodiments, the 'visual importance' property may be defined with respect to a certain projection such as a cube map. For example, the electronic device 100 may allocate different probability values to pixels according to a plane of a cube map projection in which pixels are located. For example, users are less likely to view upper or lower sides of a cube map projection of a 360-degree video. Based on this fact, the electronic device 100 may allocate small probability values to the pixels on the upper or lower sides of the cube map projection. Conversely, the electronic device 100 may allocate high probability values to pixels on a front, back, left, or right side of the cube map projection.

In some embodiments, the electronic device 100 may determine pixel probability values in consideration of a high possibility of a user facing a sound source when viewing the 360-degree video. Accordingly, the electronic device 100 may determine pixel probability values, based on positions of pixels corresponding to at least one sound source in the 360-degree video. For example, sound sources in a 360-degree video associated with a concert may include musicians on a stage or loud speakers arranged in a concert hall. Therefore, the electronic device 100 may allocate high probability values to pixels on or near the sound sources.

Figure 8:
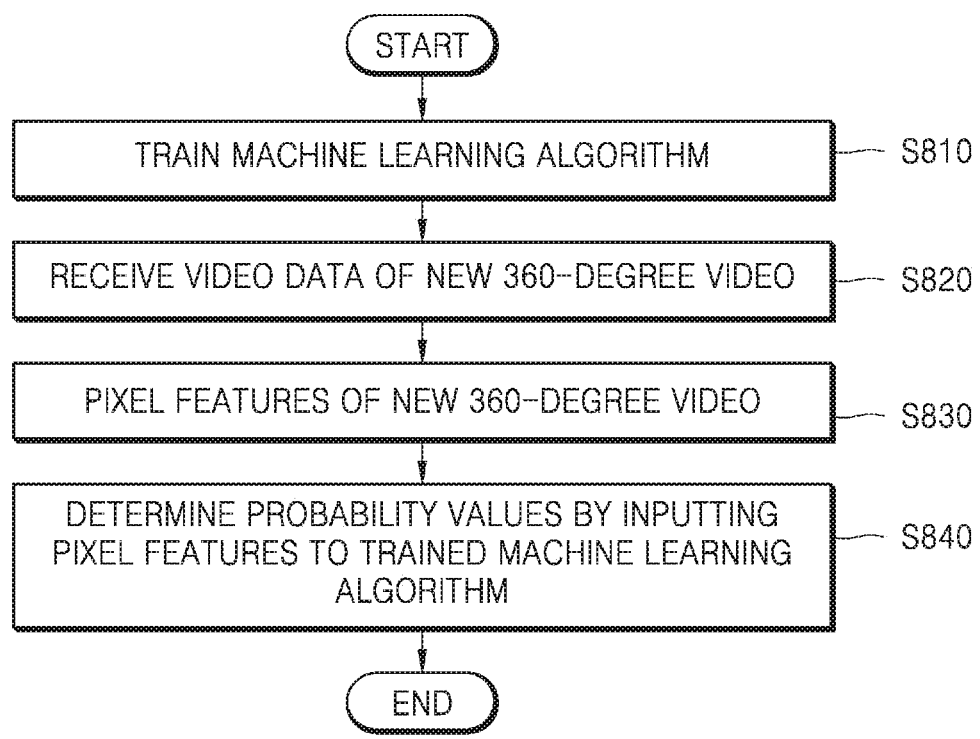
FIG. 8 is a flowchart of a method of determining, by an electronic device, probability values, based on various pixel characteristics according to an embodiment.

FIG. 8 is a flowchart of a method of determining, by an electronic device, probability values, based on various pixel characteristics according to an embodiment. In one embodiment, the electronic device 100 may determine probability values of pixels by using a machine learning algorithm. The machine learning algorithm may receive one or more features of a pixel as an input.

Referring to FIG. 8, the electronic device 100 may train a machine learning algorithm (S810). The machine learning algorithm may be trained using viewing history data about a previous user's FoV and known features of pixels of 360-degree videos when one or more 360-degree videos are viewed. The machine learning algorithm may be trained to identify certain combinations of features of pixels of a portion of a 360-degree video on which a user generally focuses, based on information about the previous user's FoV.

The electronic device 100 may receive video data of a new 360-degree video (S820). In this case, the term "new 360-degree video" refers to a 360-degree video different from at least one 360-degree video used to train the machine learning algorithm.

The electronic device 100 may obtain pixel features of the new 360-degree video (S830). For example, the electronic device 100 may automatically analyze the new 360-degree video to obtain pixel properties. Alternatively, information about features (e.g., object type property) may be input to the electronic device 100. Alternatively, the electronic device 100 may obtain pixel features from metadata of the new 360-degree video.

The electronic device 100 may determine probability values for pixels of the new 360-degree video by inputting the pixel features into the trained machine learning algorithm (S840). For example, when the viewing history data for the new 360 degree video is not available, the electronic device 100 may generate a pixel probability map for the new 360 degree video by using a machine learning algorithm. However, embodiments are not limited thereto.

The machine learning algorithm may be trained and implemented by the same device or different devices. For example, a device that processes and displays a 360-degree video may process the new 360-degree video and thereafter retrain (update) the machine learning algorithm during reproduction of the new 360-degree video, based on information obtained by monitoring a user's FoV. However, embodiments are not limited thereto.

According to the embodiment described above with reference to FIG. 8, when the 360-degree video is reproduced, the electronic device 100 uses the machine learning algorithm to convert various features of individual pixels into probability values related to a possibility that the pixels are included in the FoV. In another embodiment, the electronic device 100 may determine probability values to be allocated to a plurality of pixels, based on a certain relationship between a probability value and one or more features (e.g., a certain equation in which pixel features are used as variables), instead of using the machine learning algorithm. However, embodiments are not limited thereto.

Figure 9:
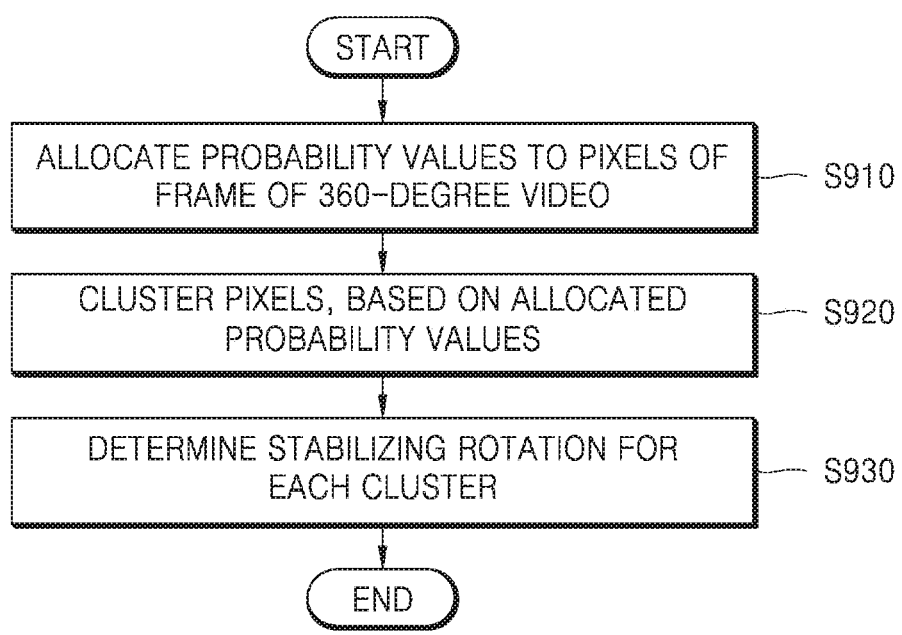
FIG. 9 is a flowchart of a method of determining, by an electronic device, a rotation for stabilizing each of a plurality of clusters.
Figure 10:
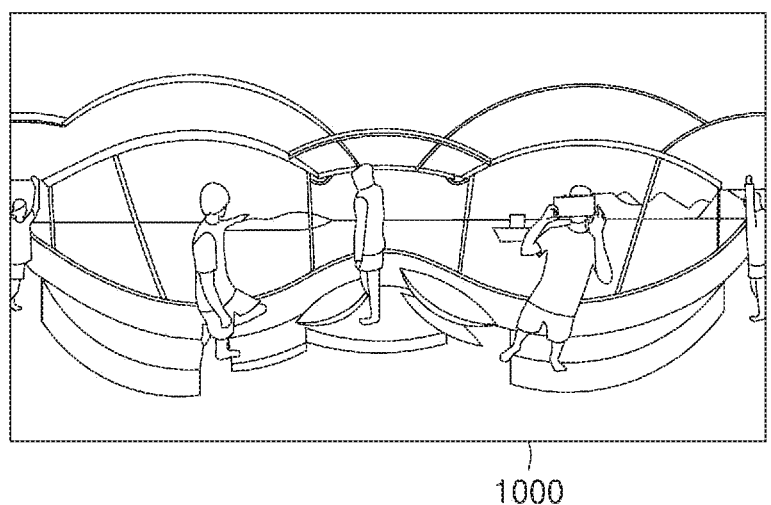
FIGS. 10 to 11D are diagrams for explaining the method of FIG. 9.
Figure 11A:
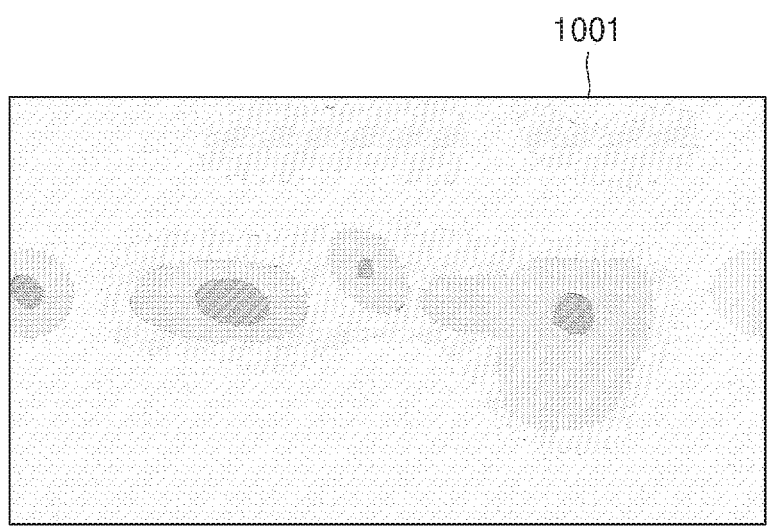
Figure 11B:
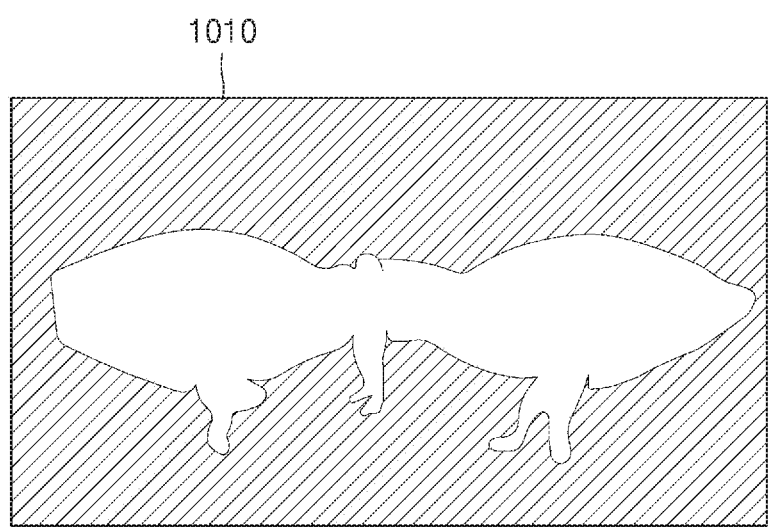
Figure 11C:
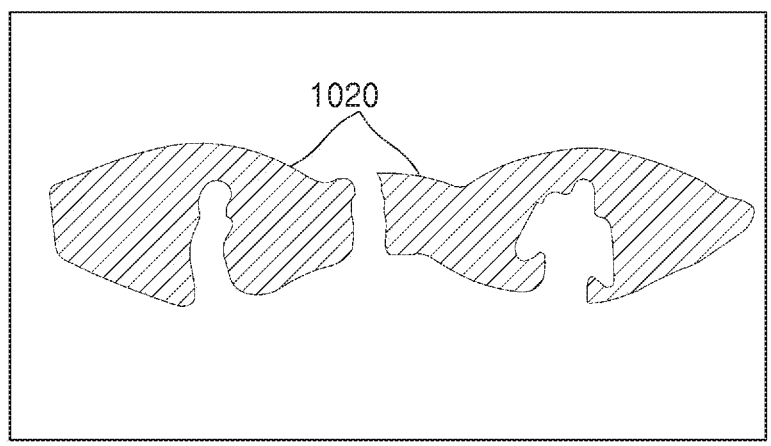
Figure 11D:
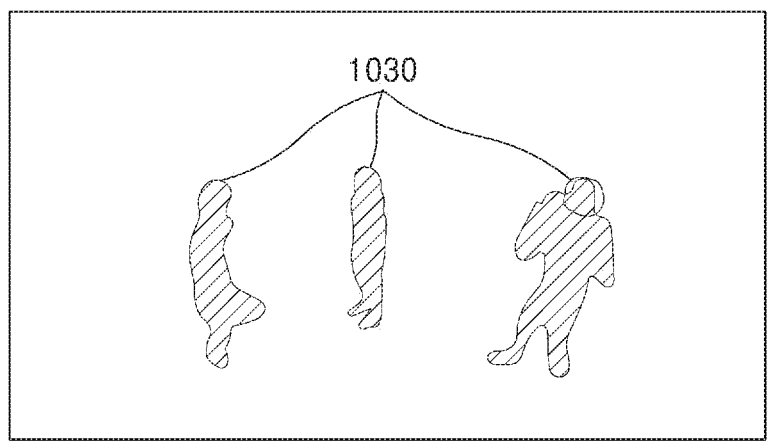

FIG. 9 is a flowchart of a method of determining, by an electronic device, a rotation for stabilizing each of a plurality of clusters, and FIGS. 10 to 11D are diagrams for explaining the method of FIG. 9.

Referring to FIG. 9, the electronic device 100 may allocate probability values to pixels of a frame of a 360-degree video (S910). For example, the electronic device 100 may allocate probability values to the pixels by using one of the methods described above with reference to FIGS. 2 to 8.

The electronic device 100 may cluster the pixels, based on the allocated probability values (S920). For example, the electronic device 100 may analyze a pixel probability map and allocate pixels to one or more clusters according to an analysis result by using a clustering algorithm. In this case, the number N of clusters may be a predetermined value or may be set according to currently available processing resources. The number N of clusters may be 1 (i.e., N=1). Clustering refers to grouping objects by including similar objects in a cluster. For example, the electronic device 100 may cluster the pixels by including similar pixels in one cluster. Various clustering algorithms are known in the art and thus a description of the clustering algorithm will be omitted herein. Alternatively, the electronic device 100 may allocate one pixel to several clusters or may allocate a certain pixel to only one cluster (exclusive clustering).

FIG. 10 illustrates a 360-degree video frame 1000 of a scene of people on a boat with a background of the sea and the sky seen from both sides of the boat. FIG. 11A illustrates a pixel probability map 1001 for the 360-degree video frame 1000. FIGS. 11B to 11D illustrate examples of three clusters, e.g., first to third clusters 1010, 1020, and 1030, for the 360-degree video frame 1000.

Referring to the pixel probability map 1001 of FIG. 11A, pixels representing the structure of the boat are allocated a low probability value, pixels representing the outside of the boat are allocated middle probability values, and pixels representing human faces are allocated a high probability value.

In one embodiment, the electronic device 100 may cluster pixels, based on probability values allocated in a pixel probability map. For example, referring to FIGS. 11B to 11D, pixels representing the structure of the boat (to which low probability values are allocated) may be allocated to the first cluster 1010, pixels representing the outside of the boat, e.g., the sea and the sky, (to which middle probability values are allocated) may be allocated to the second cluster 1020, and pixels representing people standing inside the boat (to which high probability values allocated) may be allocated to the third cluster 1030.

Referring back to FIG. 9, the electronic device 100 may determine a stabilizing rotation for each cluster (S930). For example, the electronic device 100 may determine a 3D rotation for stabilizing the 360-degree video, based on probability values allocated to pixels included in each cluster. In this case, the electronic device 100 may determine the stabilizing rotation in consideration of only probability values of pixels included in a cluster that is currently being processed, without taking into consideration probability values of pixels outside the cluster that is currently being processed. In addition, the electronic device 100 may determine a stabilizing rotation for the cluster by using any one of the methods described in operation S220 of FIG. 2 and operation 330 of FIG. 3. However, embodiments are not limited thereto.

In addition, in an embodiment in which a single cluster (N=1) is used, the electronic device 100 may determine one stabilizing rotation, based only on probability values of pixels included in the single cluster.

Figure 12:
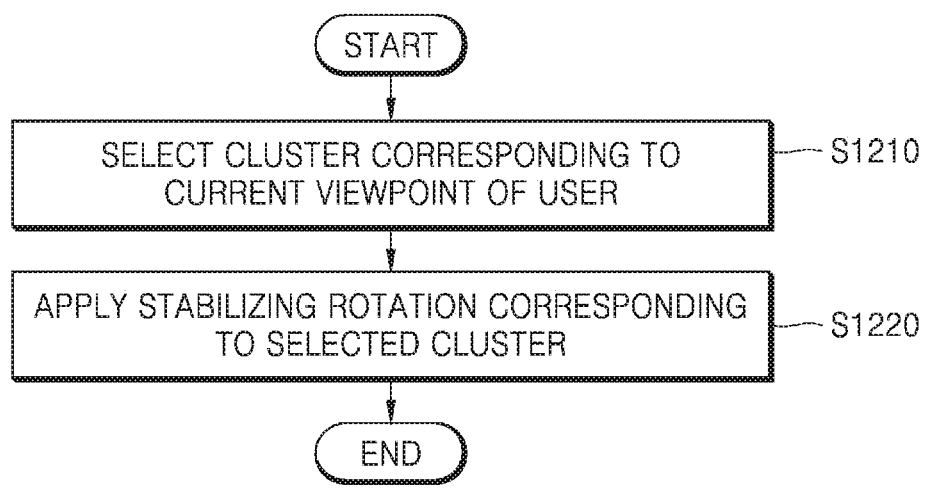
FIG. 12 is a flowchart of an operation method of an electronic device according to an embodiment.

FIG. 12 is a flowchart of an operation method of an electronic device according to an embodiment.

Referring to FIG. 12, the electronic device 100 may select a cluster corresponding to a current viewpoint of a user from among a plurality of clusters (S1210). In this case, the electronic device 100 may select a cluster corresponding to the current viewpoint of the user during reproduction of a 360-degree video. The current viewpoint may be defined as a certain point in the 360-degree video and expressed with coordinates. For example, the current viewpoint of the user may be determined as a center of a current FoV of the user or determined as a point corresponding to the user's line of sight by using a gaze tracking function.

The electronic device 100 may select a cluster in various ways. For example, a probability that pixels included in each of the plurality of clusters are located at the current viewpoint may be calculated, and a cluster including a pixel with a highest probability may be selected. When a cluster is selected in this way, the 360-degree video will be stabilized with respect to a cluster most similar to part of the 360-degree video the user is currently viewing.

A probability that a pixel included in a cluster is located at the current viewpoint may be determined, taking into consideration either the Euclidean distance with respect to the center of the cluster or temporal coherence in a plurality of frames of the 360-degree video. The "temporal coherence" means that the system may consider information about previously selected clusters when whether to change to another cluster according to movement of a camera is determined. For example, when it is determined that a user's viewpoint has moved from a first cluster to a second cluster neighboring to the first cluster, the system may wait for a certain time period before selecting the second cluster, and a stabilizing rotation corresponding to the first cluster may continue to be applied when the user's viewpoint moves back to the first cluster before the certain time period elapses. In such a hysteresis-type approach, the system prevents a sudden switch between two adjacent clusters due to a slight movement at the position of a camera when the user's viewpoint is focused on a point close to a boundary between the two clusters, and thus, it will be of help to avoid a 'sudden' reproduction experience.

Referring back to FIG. 12, the electronic device 100 may apply a stabilizing rotation corresponding to the selected cluster to the 360-degree video (S1220). For example, the electronic device 100 may apply the stabilizing rotation to video data of the 360-degree video before the 360-degree video is displayed. In the case of a pre-recorded video, an analysis of operations S910 to S930 of FIG. 9 may be performed offline and performed by a device different from a device that reproduces the 360-degree video. Alternatively, an analysis of operations S910 to S930 of FIG. 9 may be performed in real time by the device that reproduces the 360-degree video.

By using the methods described above with reference to FIGS. 9 to 12, when a user's viewpoint is moved to another part of a scene during watching of the 360-degree video, the electronic device 100 may perform video stabilization adaptively to a cluster corresponding to the user's viewpoint. Accordingly, because a video related to an object or area on which the user who is watching the 360-degree video is currently focusing may be stabilized, thereby alleviating the user's motion sickness.

Figure 13:
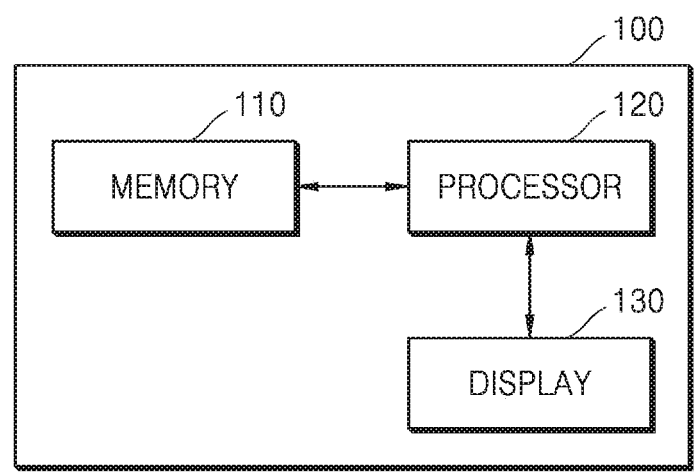
FIG. 13 is a block diagram of an electronic device according to an embodiment.

FIG. 13 is a block diagram of an electronic device according to an embodiment.

An electronic device 100 according to an embodiment may be embodied in various forms. For example, the electronic device 100 may be embodied as various types of electronic devices, e.g., a mobile phone, a smart phone, a laptop computer, a desktop computer, a table PC, an e-book terminal, a digital broadcasting terminal, a personal digital assistant (PDA), a portable multimedia player (PMP), a navigation device, an MP3 player, a camcorder, an Internet protocol television (IPTV), a digital television (DTV), and a wearable device. However, embodiments are not limited thereto.

Referring to FIG. 13, the electronic device 100 according to an embodiment may include a memory 110, a processor 120, and a display 130.

In one embodiment, the processor 120 may execute one or more programs stored in the memory 110. The processor 120 may include a single core, dual cores, triple cores, quad cores, and multiples thereof. The processor 120 may include a plurality of processors. For example, the processor 120 may be embodied as including a main processor (not shown) and a sub processor (not shown) that operates in a sleep mode.

In one embodiment, the memory 110 may store various data, programs, or applications for driving and controlling the electronic device 100.

A program stored in the memory 110 may include one or more instructions. The program (one or more instructions) or an application stored in the memory 110 may be executed by the processor 120.

The processor 120 may be configured to execute the one or more instructions stored in the memory 110 to allocate probability values to a plurality of pixels included in a 360-degree video frame. For example, the processor 120 may obtain viewing history data for FoVs of previous users, and determine probability values of pixels, based on the viewing history data. Alternatively, the processor 120 may determine probability values of the pixels, based on features of the pixels.

The processor 120 may determine a stabilizing rotation, based on the determined probability values, and apply the stabilizing rotation to the 360-degree video data to generate a stabilized 360-degree video.

In one embodiment, the display 130 generates a driving signal by converting an image signal, a data signal, an on-screen display (OSD) signal, a control signal or the like processed by the processor 120. The display 130 may be embodied as a plasma display panel (PDP), a liquid crystal display (LCD), an organic light-emitting diode (OLED), a flexible display, or the like or may be embodied as a 3D display. In addition, the display 130 may be configured as a touch screen, and used as an input device, in addition to an output device.

In one embodiment, the display 130 may display the stabilized 360-degree video.

Figure 14:
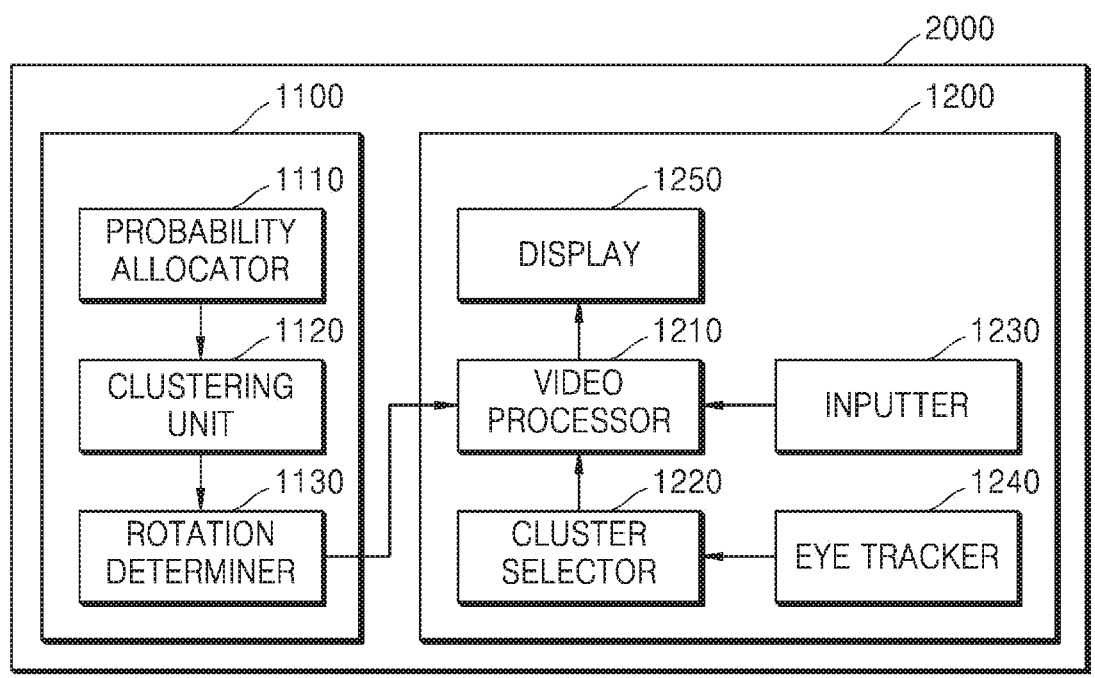
FIG. 14 is a block diagram of an electronic device according to another embodiment.

FIG. 14 is a block diagram of an electronic device according to another embodiment.

Referring to FIG. 14, an electronic device 2000 may include a first device 1100 configured to analyze a 360-degree video and determine a rotation for stabilizing the 360-degree video, and a second device 1200 configured to generate a stabilized 360-degree video, based on the stabilizing rotation provided from the first device 100. Some or all components of the first and second devices 1100 and 1200 may be implemented as one physical device.

The first device 1100 may include a probability allocator 1110 for assigning probability values to a plurality of pixels included in a 360-degree video frame, a clustering unit 1120 for allocating the plurality of pixels included in the 360-degree video frame to a cluster, and a rotation determiner 1130 for determining a 3D rotation for stabilizing the 360-degree video. In an embodiment in which clustering is not used, the first device 1100 may not include the clustering unit 1120.

In one embodiment, the rotation determiner 1130 may determine a stabilizing rotation for each of N clusters. In addition, the rotation determiner 1130 may set a 3D rotation parameter in metadata for the 360-degree video according to the determined rotation, and provide the metadata to the second device 1200. In one embodiment, the first device 1100 and the second device 1200 may communicate with each other.

In another embodiment, the first device 1100 may upload metadata to a video server. The video server may provide at least one of the 360-degree video or the metadata for the 360-degree video to the second device 1200 according to a request from the second device 1200.

In one embodiment, the second device 1200 may include a video processor 1210, and a display 1250 for displaying a stabilized 360-degree video rendered by the video processor 1210. The second device 1200 may further include an inputter 1230 for receiving a camera control input that defines camera rotation and/or camera translation. The video processor 1210 may generate a stabilized 360-degree video by applying, to video data of the 360-degree video frame, at least one of camera rotation or camera translation defined according to the camera control input, in addition to a rotation defined by the 3D rotation parameter, and rendering rotated video data.

In one embodiment, the second device 1200 may include a cluster selector 1220 for selecting a cluster corresponding to a current viewpoint of a user from among a plurality of clusters. In embodiments in which clustering is not used, the second device 1200 may not include the cluster selector 1220.

In one embodiment, the second device 1200 may further include an eye tracker 1240 for determining a current viewpoint of a user, based on eye tracking. The eye tracker 1240 may transmit information about the current viewpoint to the cluster selector 1220, and the cluster selector 1220 may select a cluster corresponding to the current viewpoint, based on the received information. Accordingly, a 3D rotation corresponding to the current viewpoint may be selected. In embodiments in which clustering is not used, the second device 1200 may include neither the cluster selector 1220 nor the eye tracker 1240.

Alternatively, in embodiments in which clustering is not used, the second device 1200 may not include the eye tracker 1240. For example, in one embodiment, the eye tracker 1240 may obtain information (viewing history data) about the current viewpoint of the user during the reproduction of the 360-degree video to obtain viewing history data for the 360-degree video that is currently being reproduced. The obtained viewing history data may be used to calculate probability values of pixels included in the 360-degree video frame when the 360 degree video file is reproduced at a later time. In addition, the viewing history data may be used to retrain a machine learning algorithm included in the probability allocator 1110, and in this case, the second device 1200 may transmit the history data to the first device 1100.

The block diagrams of the electronic devices 100 and 2000 illustrated in FIGS. 13 and 14 are only block diagrams according to embodiments. Some components of each of the block diagrams may be combined together or omitted or new components may be added thereto according to the specifications of the electronic devices 100 and 2000 that are actually implemented. That is, two or more components may be combined into one component or one component may be divided into two or more components as needed. The function performed in each block is only provided to explain embodiments and the scope of the present disclosure should not be construed as being limited to a specific operation or device therefor.

An operation method of an electronic device according to an embodiment may be embodied in the form of program instructions executable through various computer means and recorded on a computer-readable recording medium. The computer-readable recording medium may include program instructions, data files, data structures, etc. solely or in combination. The program instructions recorded on the medium may be specially designed and configured for the present disclosure or may be those well-known and available to those of ordinary skill in the field of computer software. Examples of the computer-readable recording medium include magnetic media such as hard disks, floppy disks, and magnetic tapes, optical media such as CD-ROMs and DVDs, magneto-optical media such as floptical disks, and hardware devices, such as ROMs, RAMs, and flash memory, which are specifically configured to store and execute program instructions. Examples of the program instructions include not only machine code generated by a compiler but also high-level language code executable by a computer using an interpreter or the like.

While embodiments have been described in detail above, the scope of the present disclosure is not limited thereto, and it should be understood that various modifications and improvements made by those of ordinary skill in the art using the basic concepts of the present disclosure defined in the following claims are included within the scope of the present disclosure.

The invention claimed is:

1. An electronic device for stabilizing a 360-degree video, the electronic device comprising:
   a memory storing one or more instructions; and
   at least one processor configured to execute the one or more instructions stored in the memory to:
      when the 360-degree video is reproduced, allocate probability values to a plurality of pixels included in a frame of the 360-degree video, based on a possibility that each of the plurality of pixels is included in a user's field of view (FoV),
      determine a stabilizing rotation which reduces a motion vector for the frame of the 360-degree video, based on the allocated probability values, the determining of the stabilizing rotation comprising:
         weighting motion vectors for the frame of the 360-degree video based on the allocated probability values of the pixels,
         calculating a weighted average motion vector for the frame from the weighted motion vectors,
         converting the weighted average motion vector into a three dimensional (3D) rotation, and
         determining the stabilizing rotation based on a magnitude and a direction of the 3D rotation, and
      generate a stabilized 360-degree video by applying the stabilizing rotation to the 360-degree video.

2. The electronic device of claim 1, wherein the at least one processor is further configured to execute the one or more instructions to allocate the probability values to the plurality of pixels when the 360-degree video is viewed, based on first viewing history data including information about FoVs of previous users.

3. The electronic device of claim 1,
   wherein, the at least one processor is further configured to execute the one or more instructions to determine a probability value to be allocated to one of the plurality of pixels, based on one or more features of the pixel, and
   wherein the one or more features comprise at least one of:
      a type of an object that includes the pixel;
      a depth property related to a distance between a camera and a region of the frame of the 360-degree video in which the pixel is included;
      a visual importance of the region in which the pixel is included, relative to one or more other regions of the frame of the 360-degree video;
      a motion vector associated with the pixel;
      a boundary in a saliency map of the 360-degree video which includes the pixel; or
      a position of a pixel corresponding to one or more sound sources within the frame of the 360-degree video.

4. The electronic device of claim 3, wherein the at least one processor is further configured to execute the one or more instructions to determine a probability value to be allocated to the pixel by using a machine learning algorithm to which the one or more features of the pixel are input as an input.

5. The electronic device of claim 4, wherein the at least one processor is further configured to execute the one or more instructions to, when one or more other 360-degree videos are viewed, train the machine learning algorithm by using second viewing history data including information about FoVs of previous users and well-known features of pixels included in the one or more other 360-degree videos.

6. The electronic device of claim 1, wherein the at least one processor is further configured to execute the one or more instructions to generate the stabilized 360-degree video by applying the determined rotation to data of the 360-degree video and rendering the data to which the determined rotation is applied.

7. The electronic device of claim 1, wherein the at least one processor is further configured to execute the one or more instructions to set a 3D rotation parameter for the 360-degree video according to the determined rotation.

8. The electronic device of claim 1, wherein the at least one processor is further configured to:
   execute the one or more instructions to allocate one or more pixels included in the 360-degree video to at least one cluster, and
   determine a stabilizing rotation for the at least one cluster, based on probability values allocated to the pixels included in the at least one cluster.

9. The electronic device of claim 1, wherein the generating of the stabilized 360-degree video by applying the stabilizing rotation to the 360-degree video comprises generating the stabilized 360-degree video by applying the stabilizing rotation to the 360-degree video based on a vision-based processing using key points found in the frame of the 360-degree video.

10. An operation method of an electronic device for stabilizing a 360-degree video, the operation method comprising:
    when the 360-degree video is reproduced, allocating probability values to a plurality of pixels included in a frame of the 360-degree video, based on a possibility that each of the plurality of pixels is included in a user's field of view;
    determining a stabilizing rotation which reduces a motion vector for the frame of the 360-degree video, based on the allocated probability values, the determining of the stabilizing rotation comprising:
       weighting a plurality of motion vectors for the frame of the 360-degree video based on the allocated probability values of the pixels,
       calculating a weighted average motion vector for the frame from the plurality of weighted motion vectors,
       converting the weighted average motion vector into a three dimensional (3D) rotation, and
       determining the stabilizing rotation based on a magnitude and a direction of the 3D rotation; and
    generating a stabilized 360-degree video by applying the stabilizing rotation to the 360-degree video.

11. The operation method of claim 10, further comprising:
    when the 360-degree video is viewed, obtaining first viewing history data including information about fields of view of previous users,
    wherein the allocating of the probability values comprises allocating the probability values to the plurality of pixels, based on the first viewing history data.

12. The operation method of claim 10,
wherein the allocating of the probability values comprises allocating a probability value to one of the plurality of pixels, based on one or more features of the pixel, and
wherein the one or more features comprise at least one of:
- a type of an object that includes the pixel;
- a depth property related to a distance between a camera and a region of the frame of the 360-degree video in which the pixel is included;
- a visual importance of the region in which the pixel is included, relative to one or more other regions of the frame of the 360-degree video;
- a motion vector associated with the pixel;
- a boundary in a saliency map of the 360-degree video which includes the pixel; or
- a position of a pixel corresponding to one or more sound sources within the frame of the 360-degree video.

13. The operation method of claim 12, wherein the allocating of the probability values comprises allocating a probability value to the pixel by using a machine learning algorithm to which the one or more features of the pixel are input as an input.

14. The operation method of claim 13, further comprising, when one or more other 360-degree videos are viewed, training the machine learning algorithm by using second viewing history data including information about FoVs of previous users and well-known features of pixels included in the one or more other 360-degree videos.

15. The operation method of claim 10, wherein the generating of the stabilized 360-degree video comprises:
- generating the stabilized 360-degree video by applying the determined rotation to data of the 360-degree video, and
- rendering the data to which the determined rotation is applied.

16. A non-transitory computer-readable recording medium storing a program for executing the method of claim 10 in a computer.

* * * * *